United States Patent Office 3,523,144
Patented Aug. 4, 1970

3,523,144
BLOCK COPOLYMERS OF TETRAHYDROFURAN
AND PROCESS FOR THEIR PREPARATION
Dallas D. Zimmerman, Minneapolis, Samuel Smith, Roseville, and Allen J. Hubin, Ramsey County, Minn., assignors to Minnesota Mining and Manufacturing Company, St. Paul, Minn., a corporation of Delaware
No Drawing. Filed Mar. 1, 1967, Ser. No. 619,608
Int. Cl. C08f 33/08; C08g 43/02
U.S. Cl. 260—874                                    10 Claims

ABSTRACT OF THE DISCLOSURE

Block copolymers in which at least one block is a tetrahydrofuran polymer and at least two blocks are polymers of a terminally mono-ethylenically unsaturated monomer, such as styrene, the block copolymer having a main carbon chain free of unsaturation. Preparation of these block copolymers utilizes dicationically active polymers.

---

This invention relates to new and useful block copolymers. In one important aspect is relates to high molecular weight block copolymers having elastomeric properties.

Interest in block copolymers has grown in recent years, and the literature contains many types of such polymers, including block copolymers in which the alternating blocks are elastomeric and non-elastomeric. Three segment block copolymers in which an elastomeric block separates two terminal blocks of a non-elastomeric (i.e. high glass transition temperature) polymer have been referred to as self-vulcanizing rubbers, since the ordinary vulcanization procedures are not necessary to develop the properties normally associated with a vulcanized rubber. Such block copolymers are illustrated in U.S. 3,238,173 and British patent specification No. 1,014,999. Block copolymers with more than three blocks have also been described in the literature.

Recently the "living" monocationically active polymers of tetrahydrofuran have been utilized to form terminal elastomeric blocks on each end of a central block of a non-elastomeric block obtained from a dianionic precursor, e.g. polystyrene, see Polymer Letters, vol. 4, pp. 183–186 (1966). However, these procedures and materials do not permit the preparation of either block copolymers having terminal non-elastomeric blocks on an internal elastomeric polytetrahydrofuran block or block copolymers having more than three blocks and having an internal elastomeric block consisting only of a tetrahydrofuran polymer segment.

Accordingly, it is an object of this invention to provide block copolymers having a central elastomeric polytetrahydrofuran block and two terminal non-elastomeric blocks.

Still another object of this invention is to provide block copolymers with at least one elastomeric block of a polytetrahydrofuran.

It is a further object of this invention to provide a novel block copolymer with resistance to ozone and to base hydrolysis.

Yet another object of this invention is to provide novel block copolymeric plastics.

A further object of this invention is to provide novel elastomeric block copolymers having good solubility in common organic solvents, high elongation and good tensile strength.

The block copolymers of this invention contain in alternating occurrence at least one block consisting of a tetrahydrofuran polymer having a molecular weight above about 10,000, preferably above 30,000, and at least two blocks of a second polymer of a terminally mono-ethylenically unsaturated monomer which is polymerizable by either free radical or anionic initiation, said second polymer blocks each having a minimum molecular weight of about 5,000, preferably at least 10,000, having a main carbon chain which is free of unsaturation, and having a glass transition temperature above 25° C., preferably above 40° C.

The tetrahydrofuran polymer blocks, also referred to as the "elastomeric" block, consists of a homopolymer of tetrahydrofuran or a copolymer of tetrahydrofuran and another acid polymerizable tetrahydrofuran, such as 2-methyl tetrahydrofuran, 8-oxabicyclo(4,3,0)nonane, etc. These elastomeric blocks have a glass transition temperature below 0° C., preferably below —25° C. Since the block copolymers of this invention must contain at least one internal (i.e. non-terminal) tetrahydrofuran polymer block, it is necessary that the tetrahydrofuran polymeric intermediate from which the corresponding block is ultimately derived be dicationically active, i.e., must be a polymer with two "living" ends. Such dicationically active tetrahydrofuran polymers, their preparation and control of molecular weight is described in U.S. patent application Ser. No. 527,399 (corresponds to British Pat. 1,120,304), the disclosure of which is incorporated herein by reference.

The blocks consisting of a polymer of terminally mono-ethylenically unsaturated monomer, also referred to as "non-elastomeric" blocks, may constitute homopolymers or copolymers of such monomers. These monomers may be polymerized to form the non-elastomeric blocks by either free radical polymerization techniques or by anionic polymerization techniques (i.e. base initiated polymerization), both of which techniques are well known.

When free radical polymerization techniques are used, each end of the tetrahydrofuran dicationically active polymer may be first terminated with a group having high chain transfer activity in free radical reactions, such as a thiol terminal group provided by reaction with hydrogen sulfide or a metal hydrosulfide, as described in Ser. No. 527,399. Then one or more suitable free radical polymerizable, terminally mono-ethylenically unsaturated monomers (e.g. styrene, alpha-methyl styrene, vinyl pyridine, methyl methacrylate, vinyl naphthalene, etc.) can be polymerized in the presence of the resulting polytetrahydrofuran dithiol to form by chain transfer a block copolymer in which the blocks are joined through thioether linkages. In the free radical polymerization technique the molecular weight of the non-elastomeric block is controlled principally by the chain transfer constant of aliphatic mercaptans with the specific mono-ethylenically unsaturated, free radical polymerizable monomer and also by the relative molar concentrations of polytetrahydrofuran dithiol and the free radical polymerizable monomer. The latter may be controlled throughout the reaction by incremental addition of one of the reactants to provide a more homogeneous product.

The non-elastomeric blocks may also be prepared by anionic polymerization of a terminally mono-ethylenically unsaturated monomer to form a "living" polymeric mono-anion or poly-anion. "Living" polymeric mono-anions or poly-anions (e.g. di-anions) may be formed by reaction of the base polymerizable monomer with a catalytic amount of a strong base, usually an organometallic compound in which an alkali-metal is associated with a carbon atom of an alkyl or aryl group, e.g. butyl and isobutyl lithium, dilithiostilbene, etc., as is reported in the literature. Polymeric mono-anions are conveniently obtained from the use of a catalyst having one atom of an alkali metal associated with an alkyl or aryl group, whereas the polymeric di-anions can be obtained from the use of an organometallic catalyst having two atoms of alkali metal. Suitable illustrative monomers for these reactions include vinyl aromatic compounds, such as one or more monovinyl aromatic hydrocarbon of the benzene series (e.g. styrene, vinyl toluene, vinyl xylene, ethyl vinyl xylene, isopropyl styrene, ethyl vinyl toluene, tertiary butyl styrene, diethyl styrene and alpha-vinyl naphthalene, as well as copolymers of at least 70% by weight of one or more of such monovinyl aromatic hydrocarbons and not more than 30% by weight of alpha methyl styrene), as described in British patent specification No. 1,014,999. Other illustrative base polymerizable monomers are 2-vinyl pyridine, 4-vinyl pyridine and methyl methacrylate. Not only are various processes for forming polymeric mono-anions and di-anions well known, but also it is known that their molecular weights can be readily controlled by selecting the appropriate concentration ratio of catalyst to monomer. This anionic polymerization is carried out in the absence of carbon dioxide, air and proton donors, such as water or alcohols, and the reaction media may be an aromatic solvent (such as benzene or toluene), a cycloalkane (such as cyclo-hexane) or an ether (such as dimethoxy ethane, tetrahydrofuran, or dioxane). Block copolymers are prepared by coupling a "living" polymeric mono-anion (i.e. a mono-anionically active polymer) or polymeric poly-anion (i.e. a poly-anionically active polymer) to each end of the tetrahydrofuran dicationically active polymer, which coupling reaction may be considered as the alkylation of two moles of the polymeric mono- and poly-anion by one mole of the tetrahydrofuran dicationically active polymer, the resulting blocks being thus directly bonded one to the other. This coupling reaction most desirably is conducted in the liquid phase, using an inert organic solvent capable of dissolving both reactants (e.g. cyclohexane or tetrahydrofuran). Although the temperature is not critical, it should preferably be conducted below about 100° C., preferably from −20° C. to 60° C. To avoid side reactions this should be carried out in the absence of carbon dioxide, air and proton donors, such as water or alcohols.

Although block copolymers of three or more blocks may be prepared in accordance with this invention, the preferred copolymers having three blocks, the internal block being a polytetrahydrofuran, have displayed very good physical properties, e.g. structural or load bearing properties, etc., particularly when the polytetrahydrofuran internal segment has an average molecular weight of at least 30,000 and the external or terminal blocks have molecular weights of at least 5,000 and glass transition temperatures of at least 25° C. (when measured as terminated polymers independent of the block copolymer in which they appear). Polytetrahydrofuran in the molecular weight range above about 30,000 has a crystalline melting point of at least about 40° C. and a glass transition temperature of about −80° C. In the crystalline form it is quite hard and leather-like. If the polytetrahydrofuran polymer having a molecular weight above 30,000 contains up to 50 mol percent of another acid polymerizable tetrahydrofuran, such as 2-methyl tetrahydrofuran (preferably up to 10 mol percent) or 8-oxabicyclo(4,3,0) nonane (i.e. 3,4-hexahydrobenzotetrahydrofuran) the crystalline melting point is reduced. The three block copolymers normally have very desirable toughness and good solubility in common organic solvents, such as aromatics, cycloalkanes, esters, ketones, chlorinated alkanes, ethers and the higher alcohols. They can be readily coated onto a wide variety of substrates to provide a tough protective film.

The most preferred three block copolymers are elastomers having tensile strengths exceeding 2000 p.s.i. and elongation exceeding 500%. When high degrees of toughness, creep resistance and flex durability are desired, the internal polytetrahydrofuran segment normally should constitute from about 40 to about 85 percent of the weight of the total block copolymer. Block copolymers of this type tend to have a relatively high modulus at low strain values, possibly due to the orientation of the polytetrahydrofuran block, a property which is related to high creep resistance. If soft materials having low initial modulus and high degrees of elasticity and toughness are desired, the crystalline melting point of the polytetrahydrofuran internal block should be reduced to 25° C. or lower, using methods described earlier.

The block copolymers of this invention are further uniquely characterized by their lack of unsaturation in the main polymer chain, thereby providing ozone resistance, and preferably by their lack of hydrolyzable groups (e.g. ester, amide, urethane, urea) in the main polymer chain, permitting use in strongly basic environments.

EXAMPLE 1

This example shows the preparation of a dicationically active polyether and its use in preparing the corresponding polyether dithiol and block copolymer products derived therefrom.

20 ml. of purified tetrahydrofuran was placed in a 250 ml. round bottom flask equipped with stirrer. At about −40° C. 3 ml. of trifluoromethane sulfonic anhydride was added, and the reactants were allowed to warm to room temperature and polymerize with stirring. Within about one hour a thick paste had formed. To this dicationically active polymer was added 100 ml. of anhydrous pyridine saturated with hydrogen sulfide, and with continued stirring additional hydrogen sulfide was intermittently bubbled in using a glass filter tube until the polymer dissolved in the pyridine (several days). The resulting product was reprecipitated in water, washed with water and dried overnight in the vacuum oven at 50° C.

The yield of tough, light colored, solid polymer was 9.7 g. The infrared spectrum showed absorption in the C-S bond (14.6 microns) region. The product had an inherent viscosity of 1.19 in benzene at .185 gram per 100 ml. benzene at 25° C., which corresponds to an approximate molecular weight of 100,000. Elemental analysis gave 0.46 weight percent sulfur, corresponding to 14 sulfur atoms per molecule. Some chain extension had occurred during the termination reaction via the formation of thioether linkages. The terminal groups were thiols. Chain extension and the accompanying molecular weight increase may be minimized by quenching the tetrahydrofuran polymer in liquid hydrogen sulfide.

Using the polyether dithiol made above, the following charges were made in ampoules:

(1)

9.5 g. styrene
0.5 g. polyether dithiol
20 g. benzene
30 mg. azobisisobutyronitrile (2)

7.5 g. styrene
2.5 g. polyether dithiol
20 g. benzene
30 mg. azobisisobutyronitrile (3)

5 g. styrene
5 g. polyether dithiol
30 g. benzene
30 mg. azobisisobutyronitrile (4)

10 g. styrene
20 g. benzene
30 mg. azobisisobutyronitrile

These ampoules were agitated at 50° C. for 5 days. The resulting block copolymers and the homopolymer control were reprecipitated in heptane and dried. Yields: (1) 6.2 g., (2) 4.8 g., (3) 6.7 g., and (4) 4.6 g. Infrared spectra were obtained, and these showed the presence of both polystyrene and polyether units in the products of ampoules 1, 2 and 3, with the proportion of polyether increasing in that order. Ten weight percent solutions in benzene of the styrene homopolymer from charge 4 and the polyether dithiol were mixed, and two distinct liquid phases formed in the mixture on standing for a few hours. No such phasing was observed for 10% solutions in benzene of block copolymeric products 1, 2 and 3 above, even after much longer periods of time. The flexibility and impact strength of the block copolymers increase appreciably with increasing polyether content. Such block copolymers find use in coatings, binders, adhesives and the manufacture of plastic parts.

EXAMPLE 2

910 grams of tetrahydrofuran was distilled, under an argon atmosphere, from $LiAlH_4$ into a dry three liter flask. 0.70 ml. of $(CF_3SO_2)_2O$ was added, and the tetrahydrofuran polymerized for 4¼ hours at 25° C. The tetrahydrofuran was blanketed with argon gas at all times.

About 400 ml. of toluene was distilled from butyl lithium (under an argon atmosphere) into a dry two liter flask. 3.5 ml. of a 21.7 weight percent solution of butyl lithium in hexane was added. After the temperature was raised to 50° C., 130 grams of styrene monomer was added dropwise over a 45 minute period. The temperature of the solution was held at 50 to 60° C. The polystyrene solution was red in color, indicating that the polymer was "alive." The solution was agitated for an additional 45 minutes before being allowed to cool to room temperature.

After the tetrahydrofuran had polymerized to the desired molecular weight, it was diluted with approximately 1300 ml. of anhydrous toluene. The "living" polystyrene was then added to the "living" and dicationically active polytetrahydrofuran. Both the toluene diluent and the "living" polystyrene were transferred to the central flask containing the "living" polytetrahydrofuran without any exposure to air or moisture. The red color of the "living" polystyrene faded gradually over a ten minute period to give a completely clear and colorless solution of the block copolymer product.

A film of the block copolymer was completely clear and had the following tensile properties:

Tensile at break—2630 p.s.i.
Elongation at break—670%
Permanent set at break—54%

The film oriented upon stretching and crystallized slowly at room temperature. As determined by I.R. spectra, the block copolymer contained 72 parts by weight of polytetrahydrofuran and 28 parts by weight of polystyrene. The block copolymer had an inherent viscosity in benzene at 25° C. of 1.39 (.2692 gram per 100 ml. benzene) while the polytetrahydrofuran and polystyrene homopolymer intermediates had inherent viscosities of 0.80 (.3228 gram per 100 ml. benzene) and 0.12 (.276 gram per 100 ml. of benzene) respectively.

EXAMPLE 3

340 g. of tetrahydrofuran and 135 g. of 2-methyl tetrahydrofuran were distilled under argon from $LiAlH_4$ into a dry 1 liter flask equipped with a stirrer and an inert gas inlet valve. 0.35 ml. of $(CF_3SO_2)_2O$ was added to the flask and the monomers copolymerized in an argon atmosphere for 23 hours at 26° C. to produce a "living" tetrahydrofuran copolymer. This "living" tetrahydrofuran copolymer, having about 11 weight percent of 2-methyl tetrahydrofuran, may be used in place of the "living" tetrahydrofuran homopolymer for producing a block copolymer by the procedure of Example 2. Yield of the "living" tetrahydrofuran copolymer was 112 g. Inherent viscosity was 1.08 (0.2444 gram per 100 ml. benzene) in benzene at 25° C. After termination of the "living" tetrahydrofuran copolymer with lithium bromide, the polymer chain length was determined to be 2800 A. by gel permeation chromatography.

EXAMPLE 4

700 ml. of pure toluene was placed in a 2 liter flask equipped with stirrer, dropping funnel and a gas inlet tube. 50 ml. of toluene was distilled from the flask under an argon atmosphere to remove any moisture, and the distillate was discarded. 8.68 millimoles of butyl lithium (as a 21.7 weight percent solution in toluene) was added and the mixture was stirred and cooled to 50° C. 130 g. of styrene (previously washed with aqueous caustic, then water and finally dried over silica gel) was added dropwise over 30 minutes while stirring under a continuous blanket of argon. A deep red coloration was evidenced on the initial introduction of styrene and persisted throughout the reaction. The styrene polymerization was continued for an additional 30 minutes at 50° C.

To a separate one liter flask which had been dried by flaming were added 21.8 g. of tetrahydrofuran, which had been distilled over lithium aluminum hydride directly into this reactor, and 0.70 ml. (4.34 millimole) of freshly distilled trifluoromethane sulfonic anhydride. This mixture was stirred under an argon atmosphere for 10 minutes at 25° C. to give polytetrahydrofuran dication of approximately 2,000 molecular weight. The flask containing the polystyrene mono-anion of approximately 15,000 molecular weight had previously been attached to the flask containing the polytetrahydrofuran and, after the indicated time periods had elapsed in both reactions, a stopcock was opened to allow the viscous polystyrene solution to drain into the polytetrahydrofuran dication solution (requiring about 30 seconds).

The mixture turned colorless and was just slightly turbid. This solution was clarified by centrifuging. The 3-segment block copolymer was precipitated in methanol and then vacuum dried. Its infrared spectrum showed the presence of both polytetrahydrofuran and polystyrene. The inherent viscosity of this block copolymer was 0.23 (determined as 0.2572 gram per 100 ml. of benzene) at 25° C., while the inherent viscosity of the polystyrene before the coupling reaction was performed was 0.12 (.2604 gram per 100 ml. of benzene).

Samples of the polystyrene used in the coupling reaction and of the 3-segment block copolymer of this example were examined by gel permeation chromatography. Both products were found to have symmetrical and rather narrow molecular weight distributions. The peak of the block copolymer, as expected, occurred at a polymer chain end-to-end distance (800 A.), which was twice the value observed for the peak position of the polystyrene sample (400 A.).

Various other embodiments of the present invention will be apparent to those skilled in the art without departing from the scope thereof.

What is claimed is:

1. A block copolymer soluble in at least one aromatic, cycloalkane, ester, ketone, chlorinated alkane, ether or higher alcohol compound and consisting essentially of, in alternating occurrence, at least one internal block consisting of a tetrahydrofuran polymer having a molecular weight above about 10,000 and at least two blocks consisting of a polymer of a terminally mono-ethylenically unsaturated monomer polymerizable by free radical or anionic initiation, said latter blocks each having a minimum molecular weight of about 5,000 having a main carbon chain which is free of unsaturation and having a glass transition temperature of at least 25° C.

2. The block copolymer of claim 1 having a total of three blocks.

3. An elastomeric, three-block copolymer soluble in at least one aromatic, cycloalkane, ester, ketone, chlorinated alkane, ether or higher alcohol compound having a tensile strength of at least 2,000 p.s.i. and an ultimate elongation of at least 500 percent, said copolymer consisting essentially of an internal block of a tetrahydrofuran polymer having a molecular weight of at least 10,000 and two terminal blocks consisting of a polymer of a terminally mono-ethylenically unsaturated monomer polymerizable by free radical or anionic initiation, said two terminal blocks each having a minimum molecular weight of about 5,000, having a main carbon chain which is a free of unsaturation and having a glass transition temperature of at least 25° C., said internal block constituting from about 40 to about 85 percent of the total weight of the block copolymer.

4. The elastomeric, three-block copolymer of claim 3 in which said internal block has a molecular weight of at least 30,000.

5. The elastomeric, three-block copolymer of claim 3 in which said internal block has a molecular weight of at least 30,000 and a crystalline melting point of at least about 40° C.

6. The elastomeric, three-block copolymer of claim 3 in which said internal block has a molecular weight of at least 30,000 and a crystalline melting point below about 40° C.

7. The elastomeric, three-block copolymer of claim 6 in which said internal block is a copolymer of tetrahydrofuran and from 10 to 50 weight percent of another acid polymerizable tetrahydrofuran.

8. The elastomeric, three-block copolymer of claim 3 in which said terminally mono-ethylenically unsaturated monomer is styrene.

9. A process for the preparation of the block copolymers of claim 1 which comprises terminating both ends of a tetrahydrofuran dicationically active polymer with a group having high chain transfer activity in free radical reactions and polymerizing a free radical polymerizable, terminally mono-ethylenically unsaturated monomer in the presence of said terminated polymer to form a block copolymer by chain transfer.

10. A process for the preparation of the block copolymers of claim 1 which comprises reacting each cationically active end of a tetrahydrofuran terminally dicationically active polymer with an anionically active polymer to form a block copolymer by alkylation.

References Cited

UNITED STATES PATENTS

| | | | |
|---|---|---|---|
| 2,991,269 | 7/1961 | Nozaki | 260—874 |
| 3,050,511 | 8/1962 | Szwarc | 260—874 |

OTHER REFERENCES

Aoki et al., "Mem. Fac. Eng., Osaka City Univ.," vol. 6 (1964), pp. 225–227.

Berger et al., "Jour. Polymer Science," part B, vol. 4(3), March 1966, pp. 183–186.

SAMUEL H. BLECH, Primary Examiner

U.S. Cl. X.R.

117—161; 260—2, 32.8, 33.2, 33.4, 33.6, 33.8, 79.3, 93.5, 895, 901